No. 875,969. PATENTED JAN. 7, 1908.
H. E. WARREN.
MECHANISM FOR PREVENTING RACING IN PRIME MOTORS.
APPLICATION FILED MAR. 25, 1907.
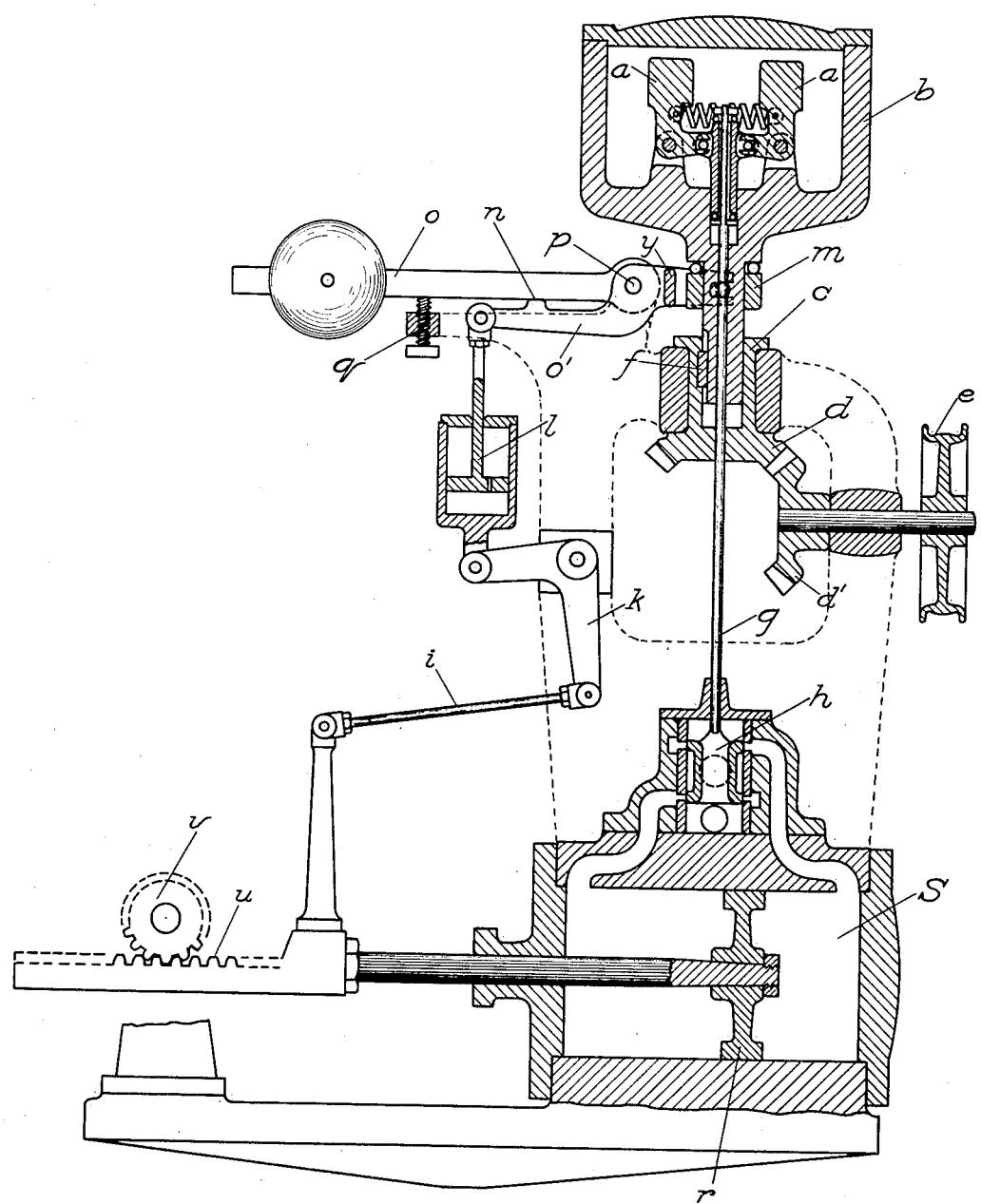
Witness
C. Henry Chase
G. W. McCaul
Inventor
Henry E. Warren

UNITED STATES PATENT OFFICE.

HENRY E. WARREN, OF ASHLAND, MASSACHUSETTS.

MECHANISM FOR PREVENTING RACING IN PRIME MOTORS.

No. 875,969.   Specification of Letters Patent.   Patented Jan. 7, 1908.

Application filed March 25, 1907. Serial No. 364,409.

*To all whom it may concern:*

Be it known that I, HENRY E. WARREN, a citizen of the United States of America, and a resident of Ashland, in the county of Middlesex and Commonwealth of Massachusetts, have invented certain new and useful Improvements in Mechanism for Preventing Racing in Prime Motors, of which the following is a specification.

This invention relates particularly to mechanism for preventing racing, commonly called "anti-racing devices."

It is well-known that centrifugal weights which are commonly used, through the agency of a valve or analogous device, to set in action powerful means, such as a hydraulic piston, act only in obedience to centrifugal force which is a function of the velocity of revolution, but since it is essential that the action of the governor should be checked before the speed of the prime-mover has come back to normal, in order to prevent the action of the governor from greatly overtraveling and causing "racing"—as it is commonly called—secondary means must be used to neutralize the action of the balls for a certain length of time while they are radially outside of their normal position.

My invention consists in novel means to accomplish this, which are more simple and effective than any previously known to me.

Certain specific forms of devices which have been effective for the purpose are hereinafter described and set forth in the accompanying drawings, wherein is shown an elevation of the apparatus in which the governor, its driving means and the hydraulic servo-motor for the prime-mover are in section.

As shown in the drawings, the fly-balls $a$, $a$, are mounted upon a somewhat heavy revolving support $b$, which receives motion from the sleeved hub $c$ of the bevel gear $d$, which is in mesh with another gear $d'$ driven from the prime-mover by a belt over pulley $e$. The revolving support $b$ is driven by means of a key $f$ in the hub $c$ so that besides its rotary motion it may freely move up and down. The stem $g$ attached to and given vertical reciprocation by the balls $a$, $a$, in the usual manner, is connected to a valve $h$ or other controller of the servo-motor $s$, hydraulic or other fluid motor.

The revolving support $b$ is maintained in a definite normal axial position by means of a two-part weighted counterbalance lever $o$, $o'$, pivoted at $p$ to a fixed part of the frame; the support $b$ has a direct ball bearing upon a collar $m$ which is provided with trunnions, engaged by the forked ends of a yoke $y$ on the end of part $o'$ of the counterbalance-lever which is also supported on the pivot $p$, and beyond such pivot has a bearing $n$ upon the underside of the part $o$. The outer end of the part $o'$ is connected with a moving part of the servo-motor $s$, as here shown with its piston rod, by means of a dashpot $l$, bell-crank lever $k$ and link $i$, so that the movements of the servo-motor act upon the bearing collar $m$ and temporarily change the vertical or axial position of the support $b$ and the centrifugal governor thereon.

In order that the governor shall maintain constant speed it is necessary that the final or normal vertical position of the revolving support $b$ should be constant, and therefore the weighted lever $o$ or some equivalent device is employed in conjunction with the weight of the support $b$ to gradually force the dashpot piston to assume such a position that the lever $o$ may rest against a stop $q$; when this occurs further motion will cease until the servo-motor again acts thereon through the operation of the centrifugal governor upon the controller $h$.

Following the sequence of operations, it will be observed that if the balls $a$, $a$, move outward under the effect of increased speed, the stem $g$ will be lifted, valve $h$ moved so as to admit liquid under pressure at the right-hand end of the cylinder $s$ and force the piston $r$ forward, thereby, through the rack $u$ operated by the piston $r$, rotating the pinion $v$ so as to reduce the amount of motive fluid supplied to the prime-mover and change its speed. The outward movement of piston $r$ transmitted through link $i$, bell-crank lever $k$, dashpot $l$ and lever $o'$, will instantly lower the revolving support $b$, at the same time depressing the stem $g$ and bringing valve $h$ back to its mid-position, even though the balls $a$, $a$, are still held out beyond their normal position because of abnormal speed. As soon as the valve $h$ is at its mid-position, further movement of the piston $r$ will cease; but as the dashpot $l$ gradually gives way under the effect of the weighted lever $o$ the revolving support $b$ with the balls $a$, $a$, will be gradually lifted, having a tendency to gain upon the valve $h$; but if the dashpot $l$ is properly adjusted this tendency toward a second re-opening of the valve *h* will be compensated for by approach of the speed to normal, which will bring the balls *a, a,* back again to their normal position. The weighted lever *o* will, of course, discontinue its effect on the dashpot *l* as soon as it reaches a bearing on the stop *q*. Action in the opposite direction, induced by the balls *a, a,* moving inward on account of diminished speed, depresses valve *h*, causes the piston *r* to move to the right, which through the dashpot connections instantly pulls down the lever *o'*, which lifts the revolving support *b* and with it the balls *a, a,* against their own gravity and thereby brings valve *h* back to its midposition. The dashpot *l* will then gradually give way to the effect of the weight of the support *b* and the balls *a, a,* thereon, until the lug *n* on the lever *o'* again rests against weighted lever *o*, when the system will be in equilibrium. By means of the adjustable stop *q* the normal axial position of the governor support *b* may be changed for the purpose of regulating the normal speed desired.

I claim:—

1. In speed regulating mechanism, a servo-motor for the prime-mover, a controller for the servo-motor, centrifugal weights mounted on a support rotated by the prime-mover, operative connection between the centrifugal weights and the controller, means to maintain a definite normal axial position of the support for the weights and means to produce temporary displacement of said support from its normal axial position.

2. In speed regulating mechanism, a servo-motor for the prime-mover, a controller for the servo-motor, centrifugal weights mounted on a weighted support rotated on a vertical axis, operative connection between the centrifugal weights and said controller, means to maintain a definite normal axial position of said weighted support and means to produce temporary displacement thereof from its normal axial position, when the speed of the prime-mover changes.

3. In speed regulating mechanism, a servo-motor for the prime-mover, a controller for the servo-motor, a centrifugal governor to operate the controller, a governor support rotated on a vertical axis, gravity operated means to produce and maintain a definite normal axial position of said support, and means to cause temporary displacement thereof, from its normal axial position when the speed of the prime-mover changes.

4. In speed regulating mechanism, a servo-motor for the prime-mover, a controller for the servo-motor, a centrifugal governor to operate the controller, a governor support rotated on a vertical axis, means to produce and maintain a definite normal axial position of said support, and adjustable means to change the definite normal axial position thereof, to regulate the normal speed of the prime-mover as desired.

5. In speed regulating mechanism, a servo-motor for the prime-mover, a controller for the servo-motor, a centrifugal governor to operate the controller, a governor support rotated upon a vertical axis, a bearing for the support, a counterbalance lever to hold the support in a definite normal plane of revolution, and means operated by the servo-motor to temporarily displace the governor support from such normal plane.

HENRY E. WARREN.

Witnesses:
IRVING B. DODGE,
CHESTER W. McCAUL.